United States Patent [19]

Goldschild et al.

[11] 4,350,205
[45] Sep. 21, 1982

[54] WORK OVER METHODS AND APPARATUS

[75] Inventors: Pierre H. Goldschild, Vulaines-sur-Seine; Christian C. Robert, Melun, both of France

[73] Assignee: Schlumberger Technology Corporation, New York, N.Y.

[21] Appl. No.: 127,621

[22] Filed: Mar. 6, 1980

[30]     Foreign Application Priority Data

Mar. 9, 1979 [FR] France ................................ 79 06053

[51] Int. Cl.³ ............................................. E21B 23/00
[52] U.S. Cl. .................................... 166/375; 166/131; 166/321; 166/147
[58] Field of Search ............... 166/314, 131, 149, 151, 166/184, 321, 374, 375, 147

[56]     References Cited

U.S. PATENT DOCUMENTS

| | | | |
|---|---|---|---|
| 3,329,209 | 7/1967 | Kisling | 166/321 |
| 3,375,874 | 4/1968 | Cherry et al. | 166/321 |
| 3,638,724 | 2/1972 | Salerni | 166/32 |
| 3,710,862 | 1/1973 | Young et al. | 166/131 |
| 3,750,751 | 8/1973 | Mott | 166/321 |
| 3,822,745 | 7/1974 | Mott | 166/184 |

Primary Examiner—James A. Leppink

[57]     ABSTRACT

Methods and apparatus for isolating the producing zone of a well during workover operations, particularly where the well is equipped with a production string and a submersible electric pump suspended thereon. A packer and isolation valve are set in the well above the producing zone, and a hydraulically operable control suspended on the pipe string below the pump is releasably coupled to the valve and arranged to enable remote control of the valve from the surface by adjusting the pressure of fluids in the production string or in the well annulus.

20 Claims, 14 Drawing Figures

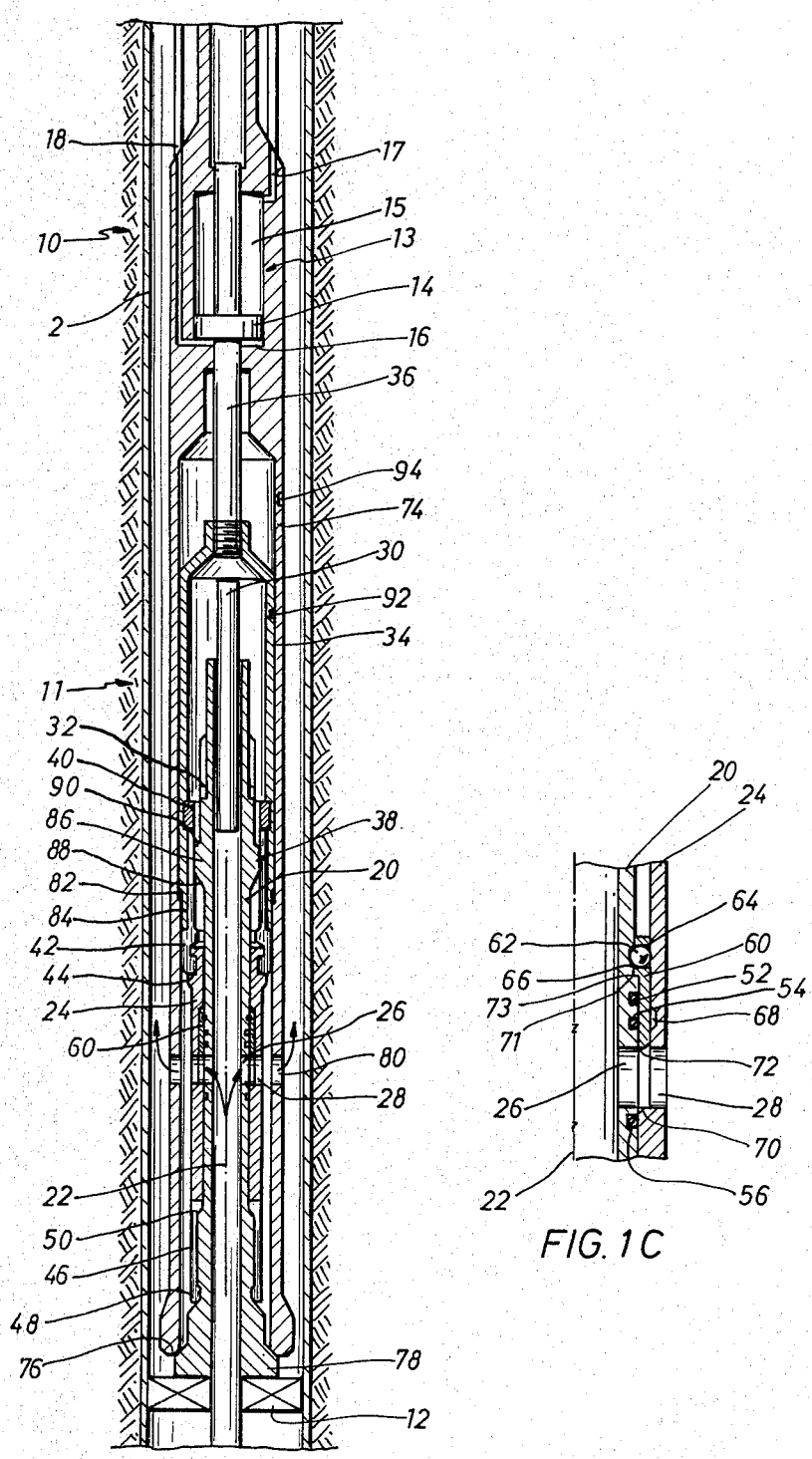
FIG. 1B
FIG. 1C
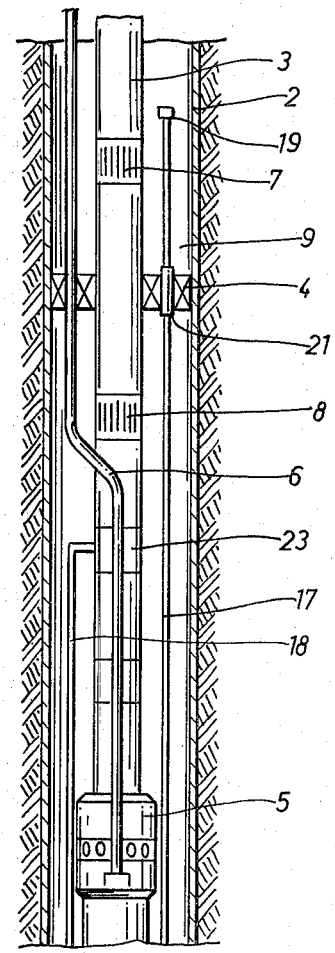
FIG. 1A

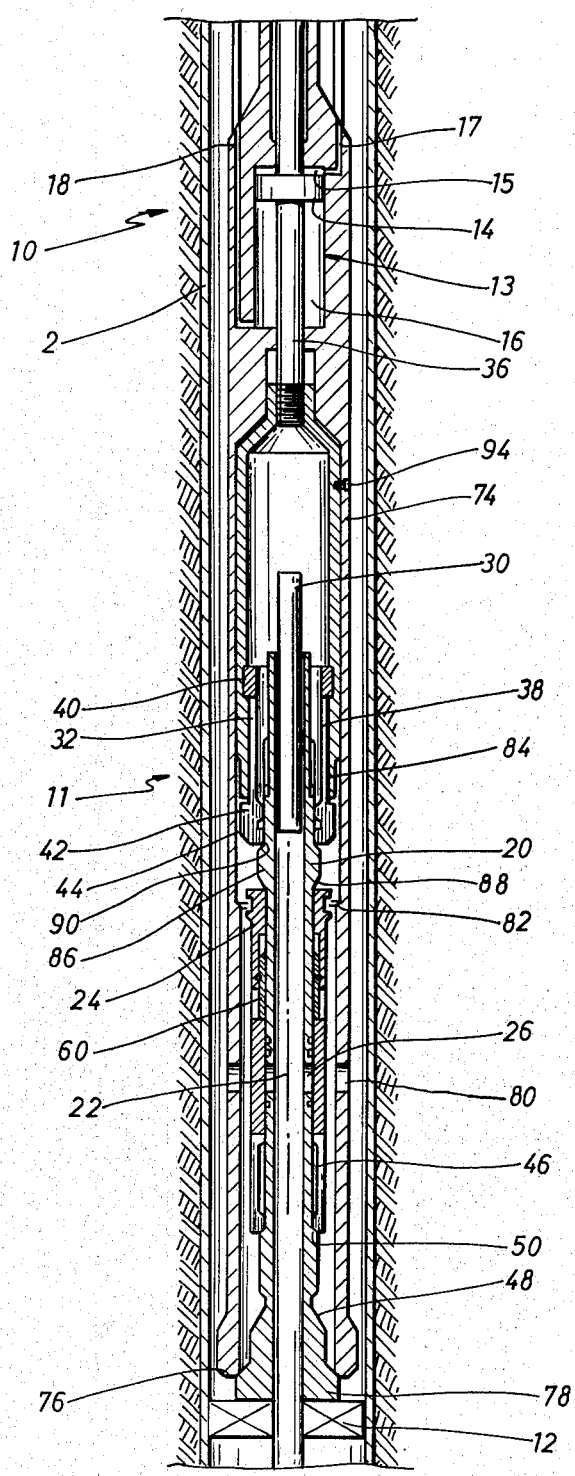
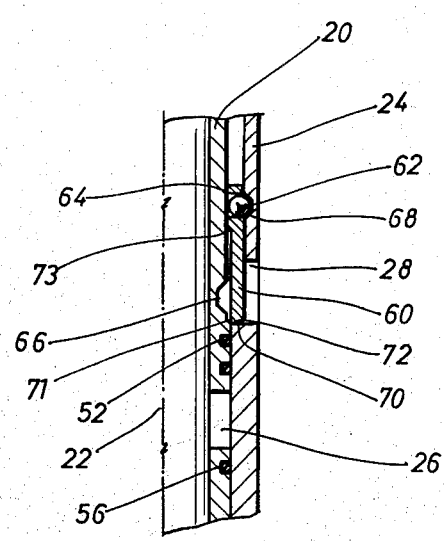
FIG. 2A
FIG. 2B

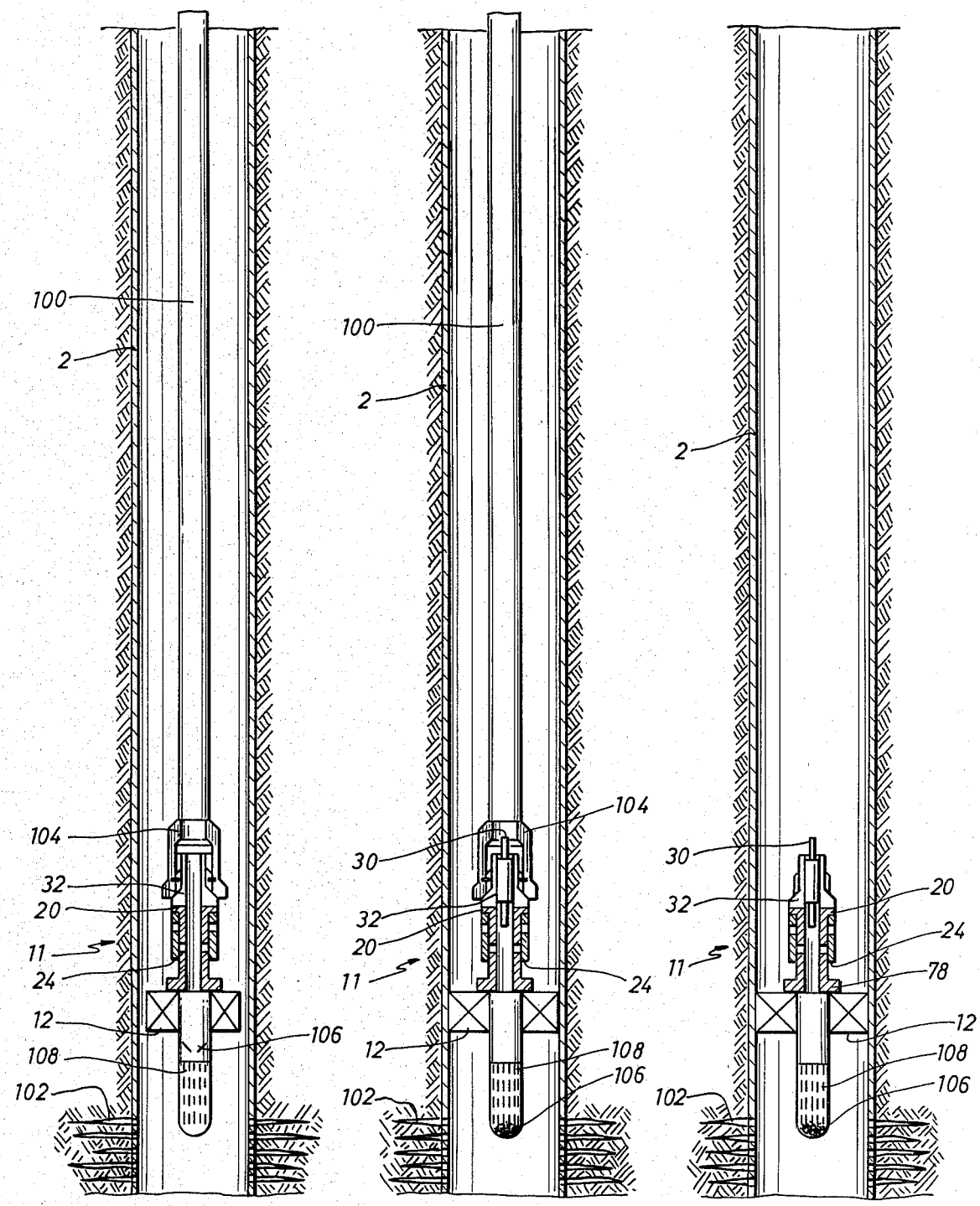

WORK OVER METHODS AND APPARATUS

This invention relates to methods and apparatus for isolating an underground producing zone from other fluids such as petroleum or natural gas in the well. The invention applies particularly to the workover of an oil well in that it allows the withdrawal of the production string and the workover of the well without killing the well.

Certain oil wells naturally produce hydrocarbons, in particular crude oil, in an unstable manner because the natural pressure of the producing zone is insufficient to offset the hydrostatic pressure of the liquid column filling the well. Other wells have an insufficient daily production. For all these wells, use is generally made of a submersible electric pump placed near and over the production zone so as to make the fluid rise to the surface while reducing the hydrostatic pressure of the liquid column. The pump, placed at the bottom of the production string, includes an electric motor which actuates vanes. It is supplied with electric power by means of an electric cable connecting the pump to an electric power source located on the surface.

In the event of malfunctioning or failure of the pump (of the electric motor or vanes), or in case of power cable breakage, it is necessary to remove the pump and hence to withdraw the entire production string. To accomplish this, it is first necessary to kill the well, i.e. exert on the producing zone a hydrostatic pressure greater than the pressure of this zone so as to prevent any blowout. One then injects into the production string a brine or mud having a density higher than that of the effluent in place in order to increase the hydrostatic pressure of the liquid column on the reservoir. In addition, when the producing layer is fractured, it is necessary to first close off the fractures by the injection, for example, of shells into the reservoir rock. In fact, if the hydrostatic pressure acting on the producing layer is increased and if the fratures are not closed off, mud will infiltrate thereinto and possibly kill the well, which may later make the flow of hydrocarbons more difficult. The operations necessary for killing the well and for plugging up the fractures of the reservoir rock sometimes require up to ten or so days, during which the well does not produce. The result is a financial loss which is very costly to the producer and which can be estimated at a production of about 50,000 to 100,000 barrels of oil.

Furthermore, when one wishes to put the well back into production, it is necessary to proceed with the reinsertion of the production string into the well with a new or reconditioned pump at its lower end. It is also necessary to inject into the reservoir an acid-based solution to dissolve the shells used for closing off the fractures. These operations often have an effect on the producing zone and cause a reduction in the production of the well. This may represent other economic and financial loss.

It also should be noted that the number of oil wells using workover techniques are increasing in number due to the steady rise in the cost of crude oil. In fact, a producing zone is not considered to be exhausted when its natural pressure is insufficient to cause the oil to come up to the surface by itself, and it is economically desirable to remove at least part of the oil remaining trapped in the reservoir rock.

It was thus important to find a solution for the possible failures in the pumping system, i.e. a means of raising the production string and more particularly the pump, without having to kill the well.

The present invention provides an apparatus and a method making it possible to overcome the difficulties indicated above. In particular, the invention makes it possible to isolate the producing zone by placing in the casing, between the producing zone and the pump, plugging means whose opening and closing are controlled hydraulically from the surface. When the annular space is closed by a packer near the producing zone, hydraulic control can be accomplished by varying in a suitable manner the pressure at the bottom of the production string, exerted by the filling liquid of the production string, with respect to the pressure of the liquid filling the annular space between the casing and the production string. On the other hand, when the annular space is closed by a packer located far from the producing zone, the hydraulic control of the plugging means is accomplished only by acting on the hydrostatic pressure of the fluid filling the production string. For this purpose, the invention proposes an apparatus for isolating an underground zone containing a fluid and communicating with the surface of the earth through a well, including: a packer adapted to be anchored in a sealed and removable manner in a well over said zone, said packer having an opening for the passage of the fluid therethrough, a valve fixed to said packer in a sealed manner and equipped with a valve sleeve movable between open and closed positions so as to allow or prevent respectively the flow of fluid to the surface through said opening, and hydraulic control means for opening and closing said valve, said hydraulic means being releasably connected to said valve and also being controllable from the surface by means of the liquid present in said well.

Said control means include means attached to the lower part of a pipe string and sensitive, in one embodiment, to the difference in the pressure exerted, on the one hand, by the liquid column filling said pipe string and, on the other hand, by the liquid filling the annular space between said drill string and the wall of said well. According to a second embodiment, said control means are sensitive to the pressure exerted by the liquid column filling the pipe string. The invention also provides a system for the workover of an oil well, of the type including a production string, a pumping assembly attached to the lower part of the string, an electric power supply cable connecting said pumping assembly to an electric power source located on the surface, a dual packer anchored in the well and having two sealed openings, one receiving said production string and the other to allow the passage of said cable, said workover system also including said device for isolating an underground zone as described previously, said valve hydraulic control means being fixed under said pumping assembly.

The invention also concerns a method for isolating an underground zone and a method for the workover of a well, these methods using for their implementation said isolating apparatus and said workover system.

The invention will be better understood through the following description of two embodiments given by way of nonlimitative examples with reference to the accompanying drawings, in which:

FIGS. 1A and 1B are cross-sectional views, with some parts in elevation, of the lower part of the production string equipped with a zone isolating apparatus with the valve element in the open position;

FIG. 1C illustrated in enlarged detail part of the valve mechanism;

FIG. 2A is a view similar to 1B but with the valve element having been closed;

FIG. 2B is a view similar to 1C with the valve closed;

FIGS. 3A, 3B and 3C are somewhat schematic views to illustrate the method of the invention for placing in the well the means for isolating the producing zone;

Figure 4A:
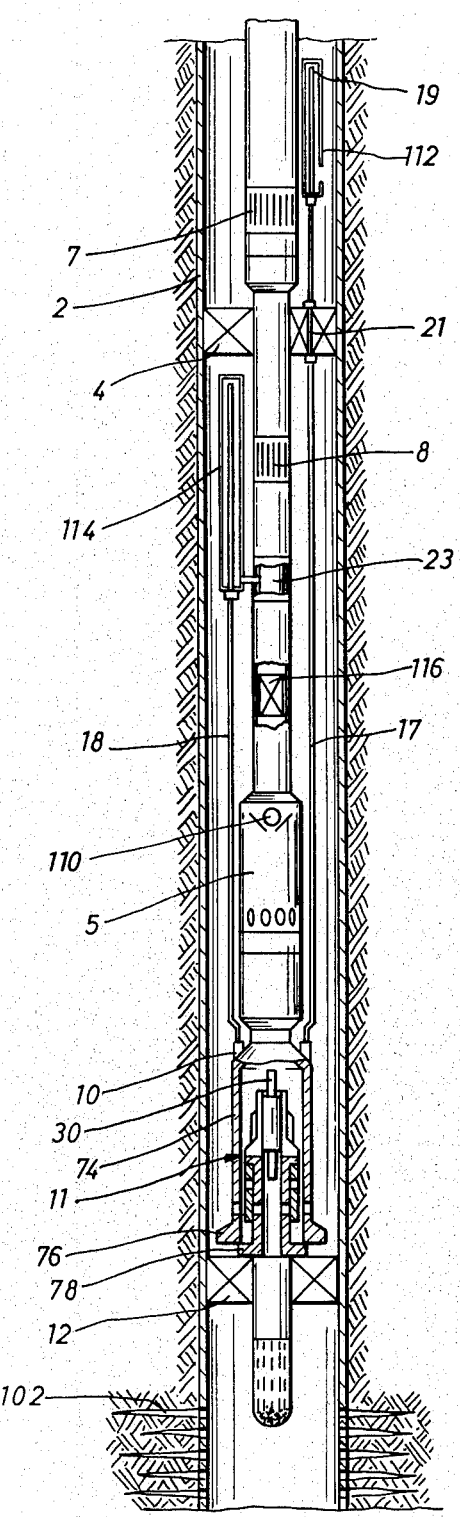
FIGS. 4A and 4B are schematic views illustrating the procedure, according to the invention, for placing the production string and for opening the isolating means.

The invention concerns an apparatus and a method making it possible to isolate the reservoir rock by placing or by actuating said apparatus at a location of the casing between the pump and the reservoir rock. It is then necessary to check that the producing zone is properly isolated, without using the pump because the pump may, in theory, be out of order. To accomplish this, it is possible for example to inject liquid into the production column by pumping from the surface, after having previously opened a circulation valve using a conventional "wireline" technique. If the pressure increases in this column and hence in the annular space owing to its being placed in communication with the production string by the circulation valve, this means the zone is properly isolated. Then, the liquid column is made heavier by circulating in the production string and the annular space, by means of a second circulation valve, a brine to avoid any blowout of the well in the event of a failure in the means used for isolating the producing zone. It is noted that the increase in hydrostatic pressure is not exerted on the reservoir and that the brine or mud does not penetrate into the reservoir. The production string can then be raised to the surface.

When one wishes to put the well back into production, the production string is lowered back into the well and is connected to the isolating means. The latter is then opened from the surface and the pump is started up again.

Referring initially to FIG. 1A, the production string 3 is placed in a concentric manner in the casing 2. This production string, fixed at its lower part by means of a dual string hydraulic packer 4, located not far from the producing zone, includes at its lower end the pumping assembly 5 composed mainly of an electric motor which actuates vanes. This motor receives its power supply through an electric cable 6 going through the dual packer 4 and connecting the pumping assembly 5 to an electric power source located on the surface. Above and below the dual packer 4 are valves of the sliding-sleeve type, known as "circulation valves", indicated respectively as 7 and 8, that makes it possible to balance the pressures between the production column 3 and the annular space 9 respectively above and below the dual packer 4. A hydraulic cylinder 10 shown in FIG. 1B is screwed at the lower part of the pump 5 shown in FIG. 1A. This cylinder constitutes part of the means of operating a valve 11 associated with a single string packer 12. The producing zone is, of course, below the packer 12.

The hydraulic cylinder 10 (FIGS. 1B and 2A) is made up mainly of a chamber 13 in which moves a piston 14 which is balanced, i.e., its opposing faces on which the same pressure is exerted have the same surface area. The piston 14 is fixed to a rod 36 screwed onto an operating liner 34. The chamber 13 is divided by the piston 14 into two parts 15 and 16 into which run the hydraulic lines 17 and 18, respectively. These lines may be made of stainless steel. The open end 19 (FIG. 1A) of the hydraulic line 17 runs into the annular space 9, thus subjecting the chamber 15 to the pressure of the annular space. The hydraulic line 17 goes through the packer 4 by means of a valve element 21 closed by inertia. A side coupling 23 allows the sealed connection of the upper end of the hydraulic line 18 to the production string. The chamber 16 located under the piston 14 is thus subjected to the pressure prevailing in the production string 3. The piston 14 is therefore subjected, on one of its two faces, to the pressure of the annular space and, on the other face, to the pressure of the production string. A difference in pressure between the annular space and the production column thus makes it possible to move the piston 14 downward when the pressure of the annular space 9 predominates, or upward in the opposite case. It is noted that if these pressures are equal, the piston remains still whatever the values of these pressures. The hydraulic cylinder 10 constitutes part of the means for controlling the opening and closing of the valve 11.

The valve 11 (FIGS. 1B and 2A) includes a valve body 20 having substantially the form of a cylinder with a longitudinal axis 22, and a sliding sleeve 24, also having a cylindrical form and the same longitudinal axis 22 as the valve body. The sleeve 24 surrounds part of the valve body 20 and can move by sliding parallel to the longitudinal axis 12. Openings 26 and 28 are pierced laterally respectively in the valve body 20 and in the sleeve 24. The openings 26 or 28 can be arranged ring-fashion in a section perpendicular to the longitudinal axis 22.

In the open position of the valve (FIGS. 1B and 1C), the orifices 26 and 28 are located opposite each other so as to form a passage for the flow of a fluid, such as crude oil, along the path indicated by the arrows in FIG. 1B. In the closed position, shown in FIGS. 2A and 2B, the orifices are no longer opposite each other.

The valve body 20 is closed at its upper end by plugging means 30, such as a plug which is a conventional device in the petroleum industry. The plug 30, represented schematically in FIGS. 1B and 2A, includes mainly sealing means, pressure equalization means, locking means and positioning means. The plug can be placed or withdrawn by conventional wireline techniques. The slots 32, of "J" shape, located at the upper part of the valve body 20 are used for positioning the tool used for placing or withdrawing the valve 11 and packer 12 assembly. The plug 30 makes it possible if necessary to gain access to the region below the packer 12 or to the lower part of the valve when it is blocked in the closed position in spite of attempts to open it.

The valve sleeve 24 can be moved by actuator means including in particular the operating liner 34 connected at its upper end to the rod 36. The rod 36 is secured to the piston 14. The result is that the liner 34 follows the movements of the piston 14. In an embodiment not shown here and in which the sliding sleeve 24 is located inside the valve body 20, the sleeve could, in a manner similar to a "circulation" valve, and in the absence of the plug 30 and the cylinder 10, be moved by spudding using wireline techniques.

The liner 34 is releasably connected to the valve sleeve 24 by elastic latching fingers 38 fixed at 40 to the liner. The ends 42 of the elastic fingers fit (FIG. 1B) into a peripheral groove 44 formed in the outer surface of the upper part of the sleeve 24. The lower end of the sleeve 24 terminates in elastic latching fingers 46. The lower ends of these fingers come up against a ramp 50 on the valve body for the closed position of the valve (FIG. 2A) in order to prevent accidental opening of the valve due, for example, to vibrations. Similarly, the ends of the elastic fingers 46 fit into a groove 48 when the valve is in the open position (FIG. 1B) in order to prevent the accidental closing of the valve.

The sealing of the valve in the closed position is achieved, on the one hand, by means of O-rings 52 and 54 (FIGS. 1C and 2B) fitting into peripheral grooves located on the outer surface of the valve body above the ports 26 and, on the other hand, by means of an O-ring 56 fitting into a peripheral groove located on the outer surface of the valve body below the ports 26. The O-rings are arranged along a section of the valve body perpendicular to the longitudinal axis 22.

The O-rings 52 and 54 are protected by a protective sleeve 60 (FIGS. 1B and 1C or 2A and 2B) having the form of a cylinder with the same axis as the longitudinal axis 22 of the valve body. This protective sleeve is mounted slidably between the valve body 20 and the valve sleeve 24. The protective sleeve 60 can be in a single part, as shown in FIGS. 1C and 2B, but can also have, advantageously, two parts separated by a washer forming a spring (not shown). The part 60 has a shoulder 73 which can come down against a shoulder 71 on the valve body 20. The movement of the protective sleeve 60 depends upon the movement of the valve sleeve 24, thanks to locking means which make it possible to secure the protective sleeve 60 to the valve body 20 for the open position of the valve (FIG. 1) and to the valve sleeve 24 for the closed position of the valve (FIG. 2). These locking means include mainly a system of balls 62 placed in recesses 64 in the protective sleeve.

The recesses 64 allow lateral movement of the balls perpendicular to the longitudinal axis 22. These balls can fit either into a peripheral groove 66 formed in the valve body 20 so as to secure the protective sleeve 60 to the valve body (FIG. 1C) or into a peripheral groove 68 to secure the valve sleeve 24 and protective sleeve 60 together (FIG. 2B). The movement of the valve sleeve 24 brings about, in the latter case, the accompanying movement of the protective sleeve. Upper and lower surfaces of the two grooves 66 and 68 are constituted by ramps allowing the balls to clear the grooves.

The distances between the lower edge 70 of the orifices 28 and the center of the groove 68, on the one hand, and between the lower edge 72 of the protective sleeve 60 and the center of the groove 66 of the valve body on the other hand, are such that when the valve sleeve 24 is driven upward by the liner 34, the balls 62 are opposite the groove 68 when the edge 70 comes into contact with the lower edge 72 of the protective sleeve 60.

A jacket 74 extends downwardly from the walls of the chamber 13 of the piston 14 and surrounds the liner 34. The lower end 76 of the jacket bears against the base 78 of the valve body. The jacket 74 is provided with ports 80 placed substantially opposite the passage formed by the ports 26 and 28. The jacket 74 has a shoulder 82 delimiting a lower part of the jacket having an inner diameter slightly smaller than the diameter of the upper part. The lower end of the liner 34 terminates in a bore 84 sliding in the smaller-diameter part of the jacket. The valve body 20 has a flange 86 with two ramps 88 and 90.

When the valve is lowered into the well, it is kept in the closed position by a shear pin whose two parts, after shearing, are shown at 92 and 94 in FIG. 1B. Shearing takes place by moving the piston 14 downwardly.

The valve operates as follows. To go from the open position shown in FIGS. 1B and 1C to the closed position shown in FIGS. 2A and 2B, one increases from the surface the pressure of the production string in relation to the pressure in the annular space so as to raise the piston 14 and thus raise the operating liner 34. The liner, secured to the valve sleeve 24 by means of the elastic latching fingers 38, carries with it the sleeve 24 in its upward movement. The protective sleeve 60 which is secured to the valve body 20 by means of the ball system 62 (FIG. 1C) remains stationary until the edge 70 of the valve sleeve and the edge 72 of the protective sleeve come into contact. For this position, the balls 62 are opposite the groove 68. The balls 62 are then cleared from the groove 66 and go into the groove 68 (FIG. 2B) with the effect, on the one hand, of disconnecting the protective sleeve 60 and the valve body 20 and, on the other hand, of connecting the protective sleeve 60 and the valve sleeve 24.

As the piston 14 continues to rise, the valve sleeve 24 and the protective sleeve 60 move upward together, the two edges 70 and 72 remaining adjacent. It is noted that the O-rings 52 and 54 are thus immediately covered by the inner surface of the sleeve 24 located below the ports 28. There is thus continuity between the inner surfaces of the protective sleeve 60 and the valve sleeve 24 so that the O-rings 52 and 54 are covered at all times.

The closing of the valve is achieved when the inner surface of the valve sleeve 24 located below the ports 28 is in contact with the O-rings 52 and 54. It can be noted that only one upper O-ring is necessary for providing the sealing but that several rings are preferable as a safety measure. If the piston 14 continues to be raised (FIG. 2A), the lower part of the elastic fingers 38 come into contact with the ramp 88 of the flange 86 thus allowing the ends 42 of the elastic fingers to come out of the groove 44 of the valve sleeve. The latter is then disconnected from the operating liner 34 (FIG. 2A). If the production string 3 is now pulled, the entire production system can be raised to the surface, including the hydraulic cylinder 10 but leaving the packer 12 and the valve 11 at the bottom of the well in the closed position. It is to be noted that for this closed position of the valve (FIG. 2A), the lower part of the elastic latching fingers 46 come into contact with the ramp 50 of the valve body 20 to hold the valve closed. The ramp 90 of the flange 86 of the valve body makes it possible to reposition the ends 42 of the elastic fingers 38 in the groove 44 of the plugging sleeve 24.

To go from the closed position of the valve to the open position, the piston 14 is moved downward while increasing from the surface the pressure in the annular space in relation to the pressure in the production string so as to lower the operating liner 34 and the valve sleeve 24. When the balls 62 come opposite the groove 66 of the valve body (FIG. 1C), on the one hand the protective sleeve 60 is disconnected from the valve sleeve 24 so the balls 62 come out of the groove 68 to go into the groove 66 and, on the other hand, the protective sleeve 60 is connected to the valve body 20. With the continued movement of the piston 14 downward, the valve sleeve 24 continues to descend, the protective sleeve remaining still because the two shoulders 71 and 73 respectively of the valve 20 and of the protective sleeve 60 are up against each other, until the ends of the elastic fingers 46 come into the groove 48 of the valve body, thereby latching the valve sleeve in the open position.

The method according to the invention making it possible to isolate the producing zone is illustrated in FIGS. 3, 4 and 5. In most cases, the hydrostatic pressure of the fluid column filling the annular space is higher than the hydrostatic pressure of the fluid filling the production string. In other words, the density of the liquid filling the annular space is frequently greater than the density of the fluid present in the production string. The method to be described below, and illustrated in FIGS. 3, 4 and 5, corresponds to this case. In this hypothesis, a positive difference in pressure, substantially at the level of the dual string packer 4, between the annular space and the production string, keeps the valve 11 open. To close the valve, it is necessary to increase the pressure in the production string so as to obtain a negative pressure difference between the annular space and the production string.

FIGS. 3A, 3B and 3C illustrate the procedure, according to the invention, for installing the producing-zone-isolating valve 11 and the packer 12. In FIG. 3A, the assembly constituted by the valve 11 and the packer 12, screwed under the valve, is lowered into the casing 2 by means of a pipe string 100 until it is slightly above the producing zone 102. The valve 11 is attached to the lower end of the pipe string 100 by means of a setting tool 104 comprising lugs cooperating with J-shaped grooves 32.

The setting tool 104 is of a conventional design and is used currently in the oil industry. The slots 32 located at the upper periphery of the valve body 20 are used for this purpose. Under the packer 12 and in the extension of the longitudinal axis of the valve are fixed a seat 106 intended to receive a ball forming a valve plug and a perforated pipe 108 used to prevent the entrainment into the production string of solid matter coming from the oil-bearing stratum. It is to be noted, firstly, that the valve 11 and the packer 12 are lowered into the well without the cylinder 10 used for opening and closing the valve and that, secondly, the valve is lowered in the closed position. The elastic fingers 46 are then against the ramp 50 (FIG. 2A) thereby keeping the valve in the closed position. A shear pin could also be used for this purpose. When the valve 11 and the packer 12 have reached the desired depth above the producing zone 102, the packer 12 is anchored in the casing 2. To accomplish this, a ball in introduced from the surface into the pipe string 100. This ball falls down to the seat 106 thus blocking the opening. By pumping liquid from the surface into the pipe string, one increases the pressure in the pipe string, thus anchoring the packer 12 in the casing 2. When the pressure reaches a certain value, the seat 106 collapses and falls with the ball to the bottom of the element 108. One then checks that the producing zone 102 is indeed isolated by pumping liquid into the annular space from the surface and one then observes, in the case where the valve 11 is closed and where there is good sealing of the packer 12, that the pressure in this space increases. The plug 30 (FIG. 3B) is then set in the valve 11 by wireline techniques, procedures which are well known in the oil industry. The sealing of the plug 30 is then checked by pumping liquid into the pipe string 100 and checking that the pressure increases therein. The pipe string is then withdrawn (FIG. 3C) by turning to the right in the example described and by pulling on it with a certain force so as to disconnect or "unjay" the setting tool 104 in relation to the upper part of the valve body 20. The producing zone 102 is thus completely isolated because the valve 11 is closed, the valve sleeve 24 closing off the ports, the packer 12 being anchored in a sealed manner in the casing, and the plug 30 closing off in a sealed manner the upper end of the valve 11.

Figure 4B:
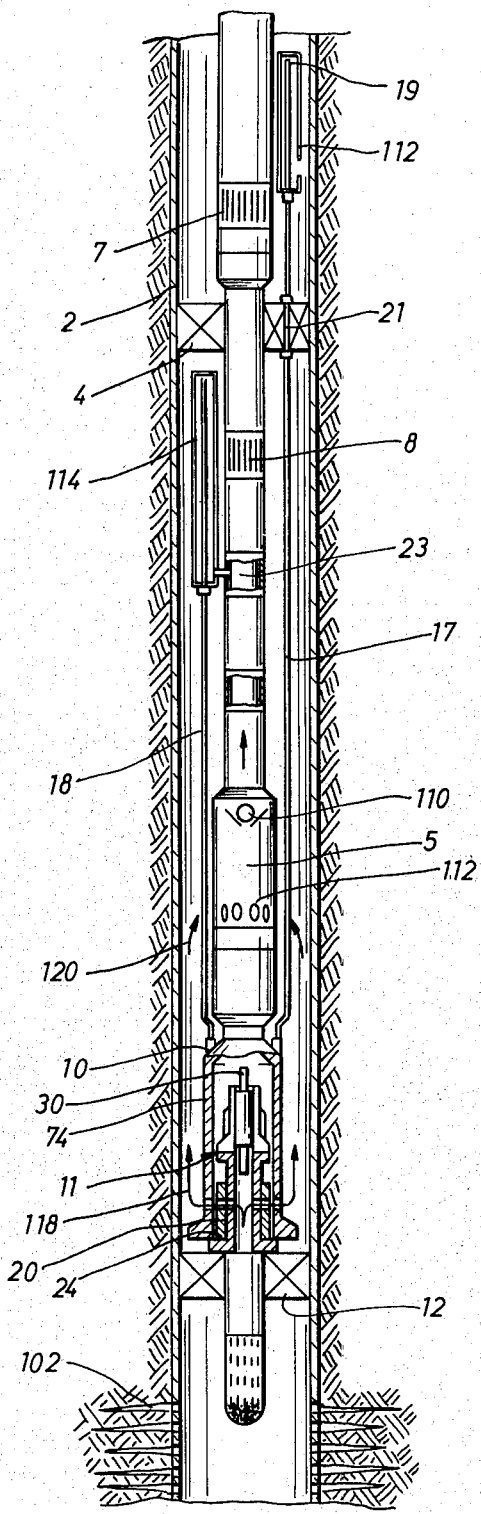

FIGS. 4A and 4B illustrate the placing of the production string or the workover string in the well and the opening of the valve to allow the actual production of the well. The production string is lowered with the hydraulic cylinder 10 attached below the pumping assembly 5. The lower portion of this string includes the dual hydraulic packer 4 equipped with an inertia valve 21 also shown in FIG. 1A, the two sliding side-door valves 7 and 8 making it possible to establish communication between the production string and the annular space respectively above and below the packer 4, the hydraulic lines 17 and 18 and the pumping assembly 5 being equipped with a standing valve 110 to prevent the return of liquid from the production string toward the producing zone 102. The ends of the hydraulic lines 17 and 18 lead into transfer chambers 112 and 114 respectively, the function of which is to prevent the pollution of the hydraulic fluid used for actuating the cylinder 10 (in fact, the mud which could contaminate the hydraulic fluid, in general oil, is heavier and settles at the bottom of the transfer chambers). The electric cable (6 in FIG. 1A but not shown in FIGS. 4 and 5) supplying the pumping assembly 5 goes through the dual packer 4 to reach the assembly 5. In the production string, a removable plug 116 is located below the coupling 23 to permit the anchoring of the dual packer 4, in a conventional manner, by increasing the pressure inside the production string. When the packer is anchored, the plug 116 is withdrawn. It may be noted that no hydraulic line comes up to the surface. The jacket 74 surrounds the valve 11, the lower end 76 of the jacket coming into contact with the base 78 of the valve body. The operating liner 34 of the valve surrounds the upper part of the valve body as shown in FIG. 2A.

FIG. 4B illustrates the procedure for opening the valve 11. To achieve this, liquid is injected from the surface into the annular space so as to increase the pressure of the column of fluid in the annular space. This pressure is transmitted through the transfer chamber 112 and through the hydraulic line 17 to the region 15 of the chamber 13 above the piston 14. The piston 14 descends, thus causing the opening of the valve. The pumping assembly 5 is then started up by means of a control located on the surface. The oil coming from the producing zone 102 goes through the valve along the path indicated by the arrows 118, and into the intake of the pumping assembly following the arrows 120 through orifices 122 to reach the production string. The liquid filling the well, used for the workover of the well, is heavier than the crude oil. However, as the pumping assembly 5 is started up again, the workover liquid in the production string is gradually replaced by oil. The hydrostatic pressure in this column thus decreases. The result is that the difference in pressure between the annular space and the production string increases until all the workover liquid is replaced by crude oil, thus keeping the valve 11 in the open position. It is to be noted that the inertia valve 21 going through the dual packer 4 plays an important safety role. In fact, if one of the two hydraulic lines 17 and 18 breaks or is no longer leak-tight, the hydraulic cylinder 10 can always be operated by acting on the pressure of the fluid in the hydraulic line still in operating condition. On the other hand, if the two lines are damaged, broken for example, and there is no valve 21, the hydraulic cylinder could no longer be moved and would be unbalanced. In fact, assuming that the hydraulic line 17 placed at the pressure of the annular space breaks under the packer 4, the crude oil could run into the annular space above the packer 4, through the hydraulic line, thus balancing the pressures of the annular space and the production string. Thanks to the inertia valve 21, this cannot occur because it closes to shut off the line 17 in the event of the rising of petroleum via this line through the packer 4.

Figures 5A, 5B:
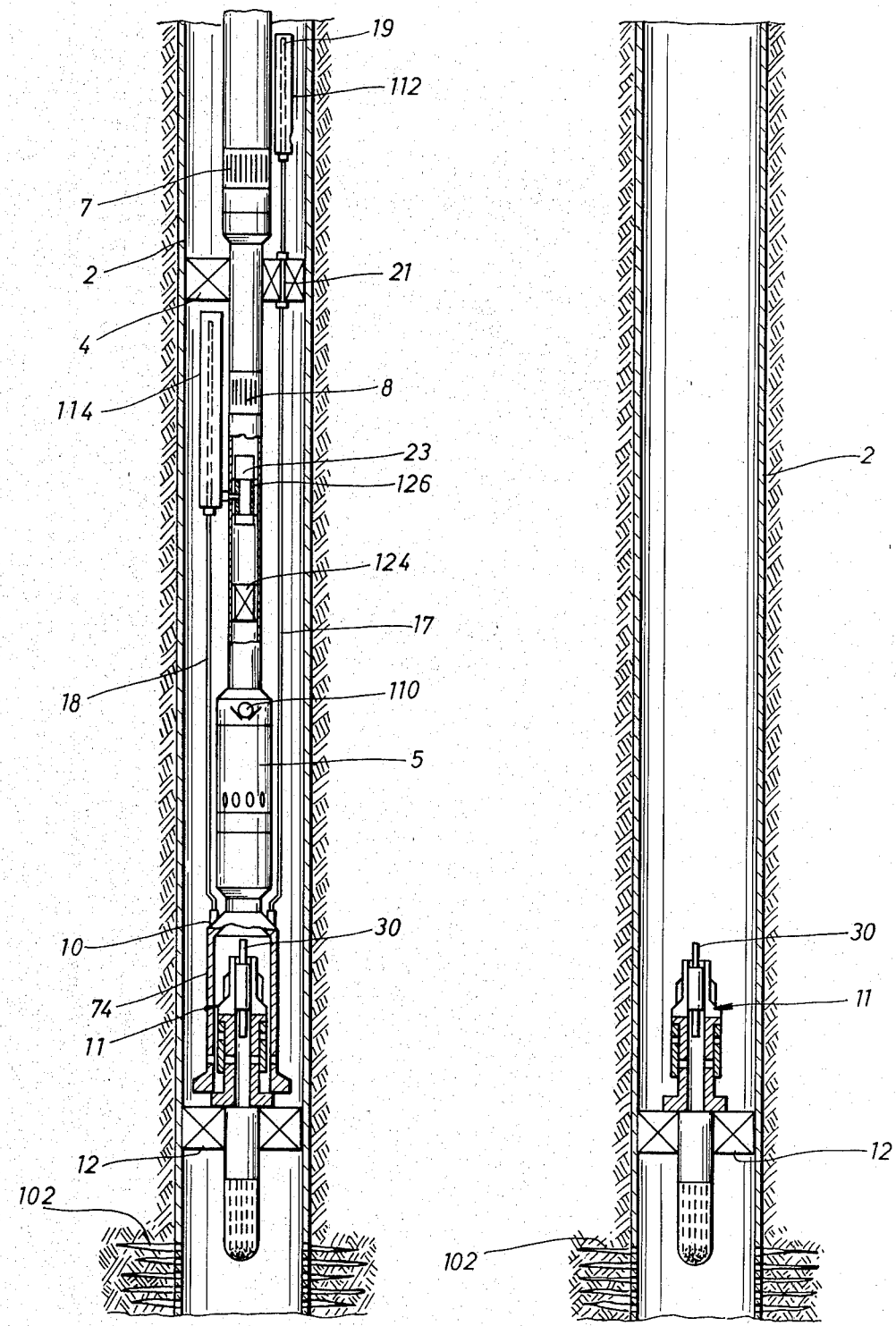
FIGS. 5A and 5B illustrate the method according to the invention for the withdrawal of the production string while leaving at the bottom of the well the means for isolating the producing zone, in the closed position.

FIGS. 5A and 5B illustrate the procedure for raising the production string to the surface, by isolating the reservoir rock 102 by means of the valve 11 in the closed position and the packer 12 anchored in the casing. The raising of the production string may be required as a result of a failure in the pumping system 5, for example. As the well was previously in production, the valve 11 is open. It is thus necessary to first close this valve. To do this, a plug 124 is lowered and installed in the production string, by wireline, between the coupling 23 and the pumping assembly 5. The pressure in the production string is then increased from the surface, thus resulting in the closing of the valve 11. To keep the valve in the closed position, the pressure in the hydraulic line 18 must be kept higher than the pressure in the annular space. Then, using a technique which is classical in the petroleum industry, one lowers a side door 126 into the coupling 23 so as to close off the communication of the hydraulic line 18 with the production string. This operation is necessary because it has been assumed from the start that, without pumping from the surface, the hydrostatic pressure of the annular space is naturally higher than the hydrostatic pressure in the production string. Leak-tightness is checked by opening the circulation valve 8 and by pumping into the production string. To balance the pressures of the annular space and the production string above and below the dual packer 4, the sliding-sleeve valve 7 is opened by conventional wireline technique. As a safety precaution, a workover fluid is injected into the well so that the hydrostatic pressure at the level of the valve 11 is slightly higher than the pressure of the reservoir rock 102. The packer 4 is then released by pulling on the production string which can then be brought up again, with the cylinder 10 which is screwed onto the lower end of the string. Then what remains (FIG. 5B) is only the packer 12 anchored in a leak-tight manner in the casing, with the valve 11 in the closed position equipped with its plug 30. The producing zone 102 is thus isolated. It is noted that the workover liquid is not in contact with the oil-bearing stratum, which is thus protected.

If it is now assumed that the hydrostatic pressure in the production string is higher than the hydrostatic pressure in the annular space, the method just described with regard to FIGS. 3, 4 and 5 is practically identical except for some obvious modifications. The valve is then kept in the open position by the pressure of the production string which is higher than the pressure of the annular space. Compared with what was stated earlier, it is thus necessary to reverse the hydraulic lines 17 and 18 controlling the cylinder. The operation for anchoring the packer 12 and the valve 11 in the closed position is the same as that described with respect to FIGS. 3A, 3B and 3C. As concerns the placing of the production string and the valve opening system described with regard to FIG. 4, the plug 116 must in this case be placed between the dual packer 4 and the side coupling 23 so as to allow the setting of the packer 4. To open the valve, the pressure is increased in the production string after having removed the plug 116 from the seat included in the circulation valve 8.

Compared with conventional production strings for the starting up of the production of wells, the system includes in addition the packer 12, the valve 11 associated with its hydraulic actuating cylinder 10, the hydraulic lines 17 and 18, the transfer chambers 112 and 114, the side coupling 23 and the inertia valve 21.

The method and apparatus just described operate in a satisfactory manner when the dual packer (FIGS. 1A, 4A, 4B and 5A) closing off the annular space is located near the producing zone. On the other hand, when this packer is far from the producing zone, the annular space is generally not completely filled with liquid and its upper part can be occupied by gas. This space is sometimes even utilized for separating the gas from the liquid when the reservoir rock produces both liquid and gas. It is thus understood that the solution previously described is not applicable. In fact, it is no longer possible to act directly from the surface on the hydraulic pressure of the annular space at the level of the isolating valve. It is also no longer possible to use a hydraulic control line (which would be too long) extending from the valve control means up to the top of the dual packer, since the latter is too far from the valve. As an example, this distance can be greater than 1000 m. The embodiment shown in FIGS. 6A and 6B makes it possible to overcome these drawbacks.

According to this embodiment, the producing zone is isolated by placing in the casing, between the producing zone and the pump, valve means of which the closing and opening are controlled hydraulically from the surface by acting only on the hydrostatic pressure of the fluid filling the production string.

Figures 6A, 6B:
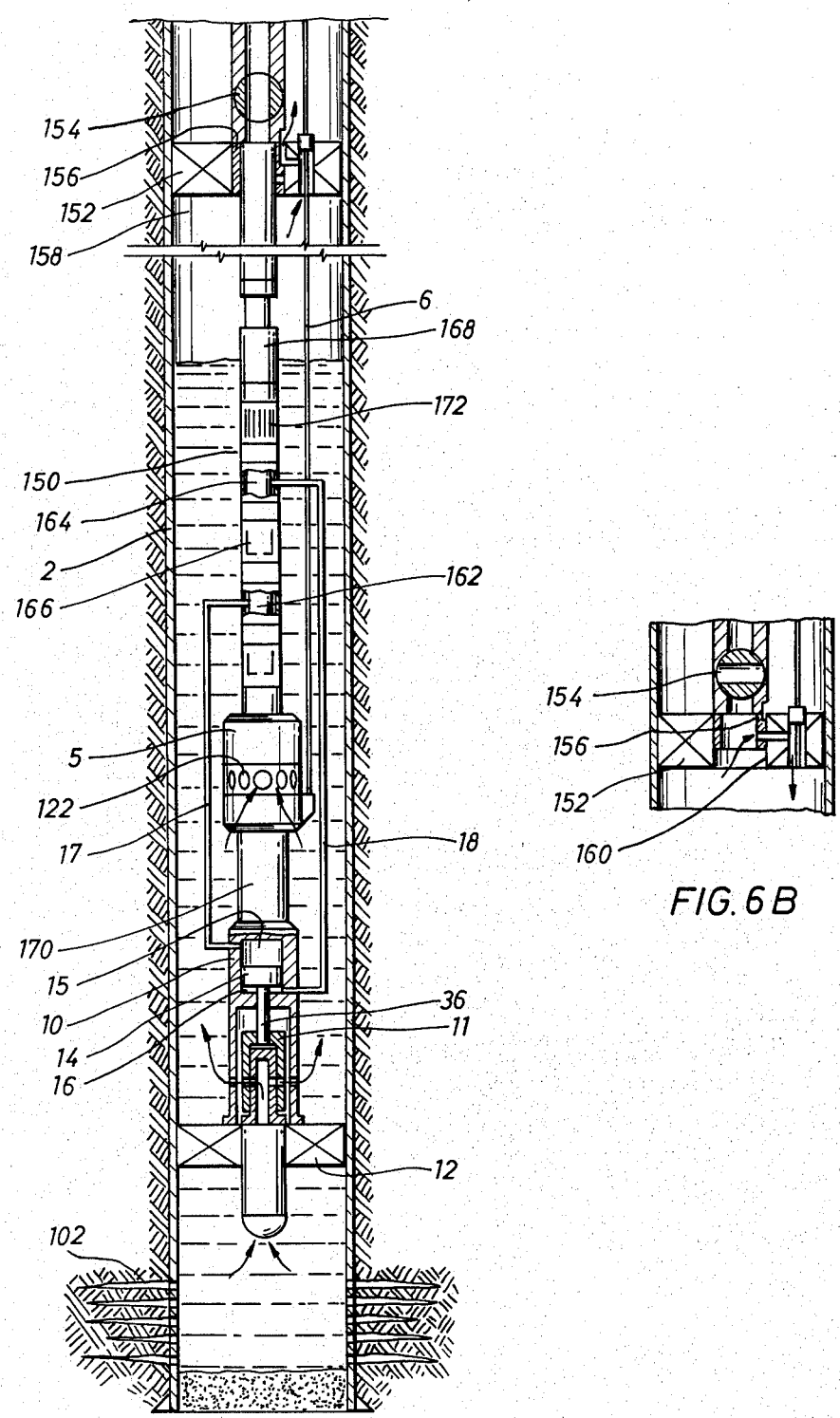
FIGS. 6A and 6B represent schematically another embodiment of the present invention that may be used when the packer is far from the producing zone.

In FIG. 6A, the production string 150 is placed concentrically in the casing 2. The lower end of the production string is located near to and above the producing zone 102. The production string includes a pumping assembly 5 composed mainly of an electric motor which drives vanes. This motor gets its power supply by means of an electric cable 6 going through a dual packer 152 located not far from the surface. This dual packer keeps the production string in place within the casing. It is located under a ball valve 154 allowing the production string to be closed from the surface. The control system for the valve 154 also controls the movement of a valve 156 enabling the annular space 158 to be placed in communication with the production string when the ball valve 154 is closed. This communication is illustrated in FIG. 6B in which the passage 160 permits the closed-circuit circulation of the liquid filling the production string. This avoids damage to the electric pump when the valve 154 is closed. The valve 154-dual packer 152 assembly is commercially available and can be supplied for example by the company Otis, Dallas, Texas, USA.

The lower end of the production string under the pump 5 is connected to the means for isolating the producing zone as indicated earlier. These isolating means include the single packer 12 and a sliding-sleeve valve 11 whose position is controlled by means of a hydraulic cylinder 10. The hydraulic cylinder includes a piston 14 connected by a rod 36 to the valve plugging sleeve. This piston delimits two chambers 15 and 16 located on each side of the piston.

The two chambers 15 and 16 are connected, respectively, by hydraulic lines 17 and 18 at two distinct, vertically spaced locations of the production string above the pumping assembly 5 by means of couplings 162 and 164 respectively. These couplings can be closed off by means of plugs placed in the couplings from the surface by wireline working. When the couplings are closed off, the communication between the hydraulic cylinder and the production string is closed. It should be noted that these couplings can be non-pluggable. In this case, the communication between the hydraulic cylinder and the production string is closed by means of a plug which is placed over the coupling to be closed off.

The piston 14 is "differential" instead of being balanced as in the first embodiment described. This means that its two faces on which the hydraulic fluid acts have different sections. It is noted in fact that the rod 36 connecting the piston to the liner closing off the sliding-sleeve valve is not present on the opposite side of the piston. The result is that the hydraulic fluid acts on a section of the piston in the chamber 15 which is larger than the section of the piston in the chamber 16. Owing to this difference in cross-sectional area, the piston is subjected to a force pushing it downward, thus keeping the valve open as shown in FIG. 6A (as the distance between the two couplings of hydraulic lines 162 and 164 is relatively small, the hydrostatic pressures of the fluids in the chambers 15 and 16 are practically the same). To move the piston upward, it is necessary first to place a plug 166 between the side couplings 162 and 164, then increase the pressure of the liquid in the hydraulic line 18 and the chamber 16 by pumping into the production string from the surface. The piston then moves upward, carrying with it the valve sleeve of the valve, so that the valve closes. The liquid in the chamber 15 is driven into the annular space through the hydraulic line 17 and through the orifices 122 of the pump 5.

According to one embodiment (not shown) of the hydraulic cylinder 10, the piston 14 can be equipped with means enabling it to be made either "differential" or balanced. The face of the piston in the chamber 15 then includes a tapped hole in which is screwed the lower part of a rod similar to the rod 36, the upper part sliding in a sealed manner in a hole made in the upper wall of the chamber 15. This hole can be closed off in a leak-tight manner by means of a plug.

Owing to the great length of the production string, which is fixed at two points by the dual packer 152 not far from the surface and by the single packer 12 near the production zone, the flow of hot liquid coming from the producing zone 102 into the production string induces an increase in the temperature of the string and hence in its length. This elongation could cause the buckling of the production string as well as serious damage to the pump 5 by subjecting the pump to compressive forces.

To overcome this problem, the embodiment described includes a telescopic joint 168 placed over the side couplings 162 and 164. This telescopic joint 168 is located not far from the pumping assembly 5 so as to reduce the weight exerted on the pump. Such a joint, currently used in the petroleum industry, is commercially available.

Assuming that the piston placed in the upper position does not move when the pressure is increased in the hydraulic line 17 and hence in the chamber 15 (piston blocked for one reason or another), the resulting force being exerted on the upper part of the chamber 15 could have the effect of lifting the part of the production string between the chamber 15 and the telescopic joint 168. The valve could then be operated and the safety of the producing-zone-isolating system would be jeopardized. To prevent this, weights such as drill collars 170 are inserted between the pump 5 and the hydraulic cylinder 10. As an example, seven meters of drill collars weigh one ton. In addition to this weight, it is also necessary to take into account the weight of the part of the production string between the pump 5 and the telescopic joint 168.

It is noted that the isolating valve is kept in the open position by the hydrostatic pressure of the liquid in the production string.

In FIG. 6A, the lower part of the annular space is filled with liquid whereas its upper part is filled with gas. The annular space can thus be used for separating the gas from the liquid when the producing zone 102 produces gas and liquid or liquid containing dissolved gases. As regards the production string, it is filled with liquid since the assembly 5 pumps the liquid from the annular space through the ports 122 into the production string toward the surface. It can also be noted that the embodiment shown in FIG. 6A also operates when the annular space is completely filled with liquid between the two packers 155 and 12. This embodiment can therefore be used in all cases.

As concerns the placing of the producing-zone-isolating means, i.e. the placing of the isolating valve 11, the packer 12 and the hydraulic cylinder, the procedure is the same as that described with respect to FIG. 3. It may be noted that the producing-zone-isolating means can be placed either with a drill string or with the production string.

The isolating valve 11 is lowered in the closed position. To open it, one need only increase the pressure in the production string by pumping liquid into this string from the surface. The piston 14 is lowered and the valve opens. After having made sure that the valve is open, the pumping assembly 5 can be started up.

To withdraw the production string, it is first necessary to close the isolating valve 11 so as to isolate the producing zone 102. To accomplish this, the plug 166 is installed under the side coupling 164 by wireline working. The pressure in the production string is increased, thereby increasing the pressure in the hydraulic line 18 and hence moving the piston upward. The valve 11 is then closed. The pressure in this hydraulic line 18 is maintained by installing a plugging sleeve in the side coupling 164. The piston 14 then remains blocked in the upper position corresponding to the closing of the valve. One checks that the valve is closed by pumping liquid into the annular space. The pressures between the production string and the annular space over the side coupling 164 are balanced by opening a sliding-sleeve valve 172, commonly known as a circulation valve. The production string can then be withdrawn with the drill collars 170 and the hydraulic cylinder 10. The valve 11 and the packer 12 remain in place so as to isolate the producing zone.

The present invention, which makes it possible to isolate a producing zone through a control located under a pumping assembly and actuated from the surface without any intermediary other than the liquid columns of the annular space and the production string, offers many advantages. Mention may be made, for example, of a time saving for the placing and removal of the production string, as well as the effective protection of the oil-bearing stratum, thus maintaining its production capacity. The opening and closing of the valve take place without any media other than the liquid column filling the production string and possibly the annular space. The production string is set on the valve or detached from it only by pushing and pulling, without any rotating movement which would be liable to damage the electric cable supplying the pump by winding it around the production string.

It goes without saying that the present invention is not limited to the embodiments described by way of example here. It is understood, for example, that the valve shown in FIGS. 1 and 2 can be of another type and not include the device for the protection of the seals.

According to the method just described, the isolating valve is advantageously lowered into the well in the closed position. It could also be lowered in the open position without departing from the scope of the invention. Similarly, the packer 12 has been described and shown under the isolating valve 11. Other configurations are possible without departing from the spirit of the present invention.

We claim:

1. Apparatus for isolating an underground earth formation intersected by a well bore, comprising: packer means having an opening therethrough and adapted to be anchored in a sealed but removable manner in the well bore above said formation; valve means connected to the upper end of said packer means, said valve means including a valve body having a flow passage communicating with said opening and with the well bore above said packer means, and a valve element mounted on said valve body and arranged for movement between positions opening and closing said flow passage; and retrievable hydraulically operable valve actuator means fixed to the lower end of a pipe string extending upwardly to the surface, said actuator means including an actuator sleeve that is adapted to be releasably connected with said valve element for moving said valve element between open and closed positions in response to the pressures of fluids in the well above said packer means.

2. The apparatus of claim 1 wherein said actuator means includes piston and cylinder means defining two spaces of variable volume, said piston means being connectable mechanically to said valve element, and means providing fluid communication between one of said spaces and said pipe string and between the other of said spaces and said annulus.

3. The apparatus of claim 2 wherein said fluid communication means includes two hydraulic lines, one of said lines extending from one of said spaces to the interior of said pipe string and the other of said lines extending from the other of said spaces to said annulus.

4. The apparatus of claim 3 wherein said fluid communication means further includes a transfer means associated with each of said hydraulic lines.

5. The apparatus of claim 1 wherein said actuator means is sensitive to the pressure exerted by the liquid filling said pipe string and includes cylinder means having piston means movable therein and defining two spaces of variable volume, said piston means being connected to said actuator sleeve, and means for providing communication between said spaces and two vertically spaced distinct locations in said pipe string.

6. The apparatus of claim 5 wherein said communication providing means include two hydraulic lines, each line connecting one of said spaces with one of said locations in said pipe string.

7. The apparatus of claim 6 wherein said actuator means further includes latch means for releasably connecting said actuator sleeve to said valve element.

8. The apparatus of claim 1 wherein said valve element is constituted by a sleeve member slidably mounted on the exterior of said valve body, said valve body having its lower end fixed to said packer means and its upper end closed in a sealed manner by removable closing means, said valve body having at least one side port adapted to be opened and closed by said sleeve member, and seal means on said valve body above and below said port.

9. The apparatus of claim 8 further including means for releasably connecting said actuator sleeve with said sleeve member, said connecting means including laterally movable latch fingers engageable with detent means in the periphery of said sleeve member.

10. The apparatus of claim 9 wherein said valve means further includes means for protecting said seal means including a protection sleeve slidably mounted on said valve body for covering said seal means in the open position of said sleeve member and means for making said protection sleeve and said sleeve member move together when said sleeve member reaches an intermediate position between its open position and its closed position.

11. In a system for the workover of an oil well of the type including a production string, a pumping assembly fixed to the bottom of the string, an electric power supply cable to connect said pumping assembly to a power source located on the surface, a packer capable of being anchored in the well and having two sealed passages, one to maintain said production string and the other to allow the passage of said electric power cable, the improvement comprising packer means sealably anchored in the well below said pumping assembly, valve means for opening and closing a flow passage through said packer means, and hydraulic means fixed below said pumping assembly and releasably connected with said valve means to enable remote control thereof.

12. The system of claim 11 wherein said hydraulic means is connected to first and second control lines, one of said control lines being in communication with the interior of said production string below said packer and the other of said control lines extending through said packer and being in communication with the annulus space above said packer.

13. The system of claim 12 further including an inertia-type valve means for closing said second control line to upward flow of fluid in the event of the breakage of the line at a point below the packer.

14. The system of claim 11 further including a sliding joint in said production string above said pumping assembly.

15. The system of claim 14 wherein said production string includes at least one drill collar section below said pumping assembly.

16. A method for the workover of a well wherein the production of fluid from a production zone takes place through a production string, comprising the steps of: isolating said producing zone by means of an isolating apparatus including a packer and an isolating valve equipped with a valve sleeve capable of sliding in a direction substantially parallel to the axis of the well and placed in the well above the producing zone by means of a setting tool; attaching at the lower end of a production string a means for hydraulically controlling said isolating valve, said controlling means including two hydraulic lines connected to two couplings of the production string, said controlling means being sensitive to the pressure prevailing in said production string and being, consequently, operable from the surface by means of a liquid filling said production string; placing said production string and said controlling means in the well and releasably connecting said controlling means to said valve sleeve; and operating said controlling means from the surface to move said valve sleeve to its opening position.

17. The method of claim 16 including the further steps of placing a plug in the production string between said two couplings; closing said valve sleeve by adjusting from the surface the pressure of fluid in the production string; closing the communication of the controlling means with the production string to maintain said valve sleeve in its closed position; balancing the pressures between the production string and the annulus; releasing the controlling means from the valve sleeve; and removing said production string and said controlling means from the well, said zone being isolated by said valve sleeve and said packer.

18. A method for the workover of a well wherein the production of luid from a producing zone takes place through a production string, comprising the steps of; isolating said producing zone by means of an isolating apparatus including a packer and an isolating valve equipped with a valve element capable of sliding in a direction substantially parallel to the axis of the well between open and closed positions, said isolating apparatus being places in the well above the producing zone by means of a setting tool; attaching at the lower end of said production string a means for hydraulically controlling said valve element, said controlling means being sensitive to differences in the pressures in production string and the annulus and being, consequently, operable from the surface by means of the liquid filling said production string and said annular space; placing said production string and said controlling means in the well and releasably connecting said controlling means to said valve element; and operating said hydraulic controlling means from the surface to move said valve element into its open position.

19. The method of claim 18 including the further steps of closing said valve element by adjusting from the surface the difference in pressure between the production string and the annulus; closing off communication of the hydraulic controlling means and the production string to maintain said valve element in its closed position; balancing the pressures between the production string and the annulus by opening a circulation valve; obtaining, by fluid circulation, a pressure at the level of said isolating valve higher than the pressure of the producing zone; releasing the controlling means from the valve element; and removing said production string and said valve controlling means from the well, said zone remaining isolated by said isolating valve and by said packer.

20. The method of claim 19 including the further step of after closing off the communication between the hydraulic controlling means and the production string, checking the sealing of the underground-zone-isolating apparatus by increasing the pressure in the annulus above the isolating apparatus.

* * * * *